United States Patent
Kaplan et al.

(10) Patent No.: US 9,537,318 B2
(45) Date of Patent: Jan. 3, 2017

(54) MODULAR ENERGY STORAGE SYSTEM

(71) Applicant: 1Energy Systems, Inc., Seattle, WA (US)

(72) Inventors: David L. Kaplan, Seattle, WA (US); Joshua I. Kaplan, Seattle, WA (US); Gregory P. Darlington, Snohomish, WA (US)

(73) Assignee: Doosan GridTech, Inc., Seattle, WA (US)

( * ) Notice: Subject to any disclaimer, the term of this patent is extended or adjusted under 35 U.S.C. 154(b) by 809 days.

(21) Appl. No.: 13/668,172

(22) Filed: Nov. 2, 2012

(65) Prior Publication Data

US 2013/0113294 A1 May 9, 2013

Related U.S. Application Data

(60) Provisional application No. 61/555,649, filed on Nov. 4, 2011, provisional application No. 61/589,554, filed on Jan. 23, 2012.

(51) Int. Cl.
*H02J 3/28* (2006.01)
*H02J 3/36* (2006.01)
*H02J 7/34* (2006.01)

(52) U.S. Cl.
CPC .. *H02J 3/28* (2013.01); *H02J 3/36* (2013.01); *H02J 7/34* (2013.01); *Y02E 60/60* (2013.01); *Y10T 307/707* (2015.04)

(58) Field of Classification Search
CPC .................. H02J 3/28; H02J 3/36; H02J 7/34; Y10T 307/707; Y02E 60/60
See application file for complete search history.

(56) References Cited

U.S. PATENT DOCUMENTS 4,607,208 A * 8/1986 Vreeland ...................... 320/145
5,949,218 A    9/1999 Colles
(Continued)

FOREIGN PATENT DOCUMENTS

| JP | 2011-101520 A | 5/2011 |
| KR | 10-2009-0029055 | 3/2009 |
| KR | 10-2011-0034888 | 4/2011 |

OTHER PUBLICATIONS

TC1044S Data Sheet, Microchip Technology Inc, 1998.*
(Continued)

*Primary Examiner* — Zeev V Kitov
(74) *Attorney, Agent, or Firm* — Perkins Coie LLP

(57) ABSTRACT

An energy storage system includes modular energy storage equipment that may be connected to an external system, such as a power grid. In at least one embodiment, the energy storage system includes a power transfer control system comprising a power transfer network and a processing module or controller. The power transfer network has a first interface coupleable to one or more energy storage units and a second interface coupleable to one or more power conversion units. One or more conductors in the power transfer network are selectively coupleable to the first interface and the second interface for transferring power between the energy storage units and the power conversion units based at least in part on information indicating a power or energy supply or demand of an external system or information indicating an amount of energy stored in the energy storage units. The energy storage system is scalable for different implementations.

50 Claims, 10 Drawing Sheets

(56) References Cited

U.S. PATENT DOCUMENTS

| | | | |
|---|---|---|---|
| 6,362,540 B1* | 3/2002 | Hill | 307/52 |
| 2005/0286277 A1* | 12/2005 | Krein | 363/65 |
| 2006/0208571 A1 | 9/2006 | Fairlie | |
| 2008/0053716 A1* | 3/2008 | Scheucher | 180/2.1 |
| 2009/0110108 A1* | 4/2009 | Kennedy et al. | 375/295 |
| 2010/0019718 A1* | 1/2010 | Salasoo | B60L 3/0046 320/103 |
| 2011/0163603 A1 | 7/2011 | Chou et al. | |
| 2012/0059527 A1 | 3/2012 | Beaston | |

OTHER PUBLICATIONS

KV-150 DC-AC Inverter, Data Sheet, Amazon Inc., 1996.*
Search Report and Written Opionion, Mar. 22, 2013, International Application No. PCT/US12/063419, filed Nov. 2, 2012, (11 pgs.).

* cited by examiner

MODULAR ENERGY STORAGE SYSTEM

CROSS-REFERENCES TO RELATED APPLICATIONS

This application claims the benefit of U.S. Provisional Patent Application No. 61/555,649, filed Nov. 4, 2011, and U.S. Provisional Patent Application No. 61/589,554, filed Jan. 23, 2012, the disclosures of which are incorporated by reference herein in their entirety.

TECHNICAL FIELD

The embodiments described herein pertain to energy storage systems with information technology subsystems that communicate with, or are embedded within, electrical equipment or systems connected to external systems, such as an electricity transmission or distribution grid to provide the grid with energy storage capabilities.

BACKGROUND

Generally, an electric power system implements three primary functions:
- generation of electrical power by any of several mechanisms such as burning fossil fuels (e.g., coal, oil or natural gas), nuclear fission, hydroelectric turbines, wind turbines, solar photovoltaic panels, etc.;
- transmission of electrical power, typically over long distances at high voltages, from sources of generation to points of distribution such as substations. Sub-transmission may further bridge between transmission and distribution voltages; and
- distribution of electrical power, typically over relatively short distances and at relatively lower voltages, from points of distribution such as substations to end customers.

Electric power system operators, such as electric distribution utilities, regional transmission operators, independent system operators and others, are tasked with maintaining an electrically stable real-time balance between electricity supply and demand. This is difficult to achieve because demand for electricity fluctuates unpredictably, future supply may diverge from actual demand, and unexpected events, such as accidents or equipment failures, may cause unplanned outages of unknown scope and duration.

Emerging clean, but-intermittent power resources, such as wind and solar power, may help reduce the burning of fossil fuels, which produces greenhouse gas emissions and other toxic pollutants. Accordingly, deployment of such clean electric power sources may increase in the coming years. Added to traditional sources of unpredictability in the electric power system, such intermittent resources may exacerbate the problem of maintaining an electrically stable real-time supply-demand balance.

Electric energy storage offers key benefits for utilities and other grid operators, including firming of wind and solar power to address the intermittency of these power sources. Other benefits of electric energy storage include improved reliability, outage backup, volt/VAR control, frequency regulation and system upgrade deferral.

Electric utilities and grid operators view energy storage as highly promising but lacking key qualities such as (i) scalability, which is required to address a wide range of applications, from meter to substation, with common technologies and protocols; (ii) interoperability, which is required to deliver flexible, multi-vendor systems; (iii) modularity, which is required for exchange, upgrade and expansion of system components; and (iv) cost-effectiveness, which is necessary to compete against other carbon polluting alternatives. Because current energy storage products lack modularity, scalability and interoperability, primary suppliers (e.g., battery manufacturers) cannot easily serve primary customers (e.g., electric utilities), thus increasing the cost and availability of energy storage products and limiting market development for all.

Accordingly, these gaps open an opportunity for a new, multi-vendor approach to energy storage, delivering battery 'storage appliances' built from optimized storage, power conversion and control components. In this new ecosystem, customers can choose best-of-breed components and upgrade, exchange, or re-use individual system elements as needs change or new technologies emerge. Thus, an energy storage architecture that was designed to enable customers to choose components that best suit their application, and upgrade, maintain or expand the system based on changing needs or new technologies, would be a significant advancement for energy storage, and the efficiency and availability of intermittent clean energy sources.

SUMMARY

Mechanisms for electric energy storage can mitigate supply-demand imbalances, by storing electric energy during periods of excess supply and returning it to the electric power system during periods of excess demand. Hence, devices or systems to store electric energy, including those based on batteries, may become more prevalent within the electric power system.

In particular, battery energy storage systems composed of modular sub-units may become more prevalent because of their inherent scalability. Such modular sub-units may be constructed from a wide variety of battery cell types and chemistries, including lithium-ion, nickel-cadmium, nickel-metal-hydride, lead-acid, zinc-air, and others both currently available and emerging.

Described herein are embodiments of systems, apparatuses, methods, and programs for enabling user installation, removal, exchange, maintenance, monitoring, control, charging and discharging of energy storage equipment, such as battery modules or power conversion modules, within an energy storage system. An example of such systems is a Modular Battery Energy Storage System (MBESS). Further enabled by the embodiments disclosed herein are maintenance, monitoring, control, charging, and discharging of an energy storage system comprised of user-accessible energy storage equipment, such as battery modules or power conversion modules.

In particular, according to at least one embodiment, a modular energy storage system includes one or more energy storage units, one or more power conversion units coupleable to an external system, and a power transfer network. The power transfer network is coupled to the one or more energy storage units via a first interface. The power transfer network is also coupled to the one or more power conversion units via a second interface. The power transfer network includes one or more conductors that are coupleable to the first interface and to the second interface for transferring power between the one or more energy storage units and the one or more power conversion units.

The power conversion units are configured to convert an electrical parameter of power transferred to and from the energy storage units in accordance with an electrical requirement of the external system or the one or more energy storage units. In various embodiments, the power conversion units are coupleable to a power grid operated by an electric utility.

The energy storage system further includes a controller in communication with the power transfer network. The controller is configured to selectively cause one or more of the conductors in the power transfer network to electrically connect one or more of the energy storage units to one or more of the power conversion units based at least in part on a power or energy supply or demand of the external system or an amount of energy stored in the one or more energy storage units.

An energy storage unit in the energy storage system may differ from another energy storage unit with regard to an electrical characteristic, such as energy capacity, power capacity, current capacity, or voltage, or with regard to a physical characteristic. Similarly, a power conversion unit in the energy storage system may differ from another power conversion unit with regard to an electrical characteristic, such as power capacity, current capacity, or voltage, or with regard to a physical characteristic.

In some embodiments, the energy storage system may comprises more energy storage units than power conversion units. Alternatively, in other embodiments, the energy storage system may comprise more power conversion units than energy storage units.

The controller may be configured to communicate with the power transfer network using a standardized, publicly available protocol. Further, the controller may be configured to communicate with one or more of the energy storage units and/or with one or more of the power conversion units. The controller may also be configured to communicate with a controller of another energy storage system as described herein.

Aspects of the energy storage system may be distributed. For example, in some embodiments, at least one of the energy storage units is housed physically separate from another energy storage unit in the energy storage system. In some embodiments, at least one of the power conversion units is housed physically separate from another power conversion unit in the energy storage system.

In some embodiments, the controller selectively causes a conductor in the power transfer network to electrically connect an energy storage unit to a power conversion unit based on an electrical characteristic of the energy storage unit. The electrical characteristic may be a state-of-charge, cycle life, calendar life, voltage, current, power or temperature. Alternatively or in addition, the controller may selectively cause a conductor in the power transfer network to electrically connect an energy storage unit to a power conversion unit based on an electrical characteristic of the power conversion unit. In this regard, the electrical characteristic may be at least one of voltage, current, or power. Energy storage units and/or power conversion units may be classified according to an operational attribute characterizing their ability to simultaneously electrically connect to a common conductor in the power transfer network.

In some embodiments, the power transfer network includes one or more switches that are responsive to the controller to selectively electrically connect a conductor in the power transfer network to an energy storage unit and to a power conversion unit. At least one of the switches may be a multi-way switch.

The first interface of the power transfer network may define one or more modular points of connection with specified electrical and physical characteristics to which the energy storage units conform for coupling to the power transfer network. Likewise, the second interface of the power transfer network may define one or more modular points of connection with specified electrical and physical characteristics to which the power conversion units conform for coupling to the power transfer network.

An energy storage unit or a power conversion unit may be electrically connected to a conductor in the power transfer network via a DC/DC converter. The power transfer between an energy storage unit and a power conversion unit may be controlled using pulse-width modulation.

In various embodiments, the present disclosure also includes a power transfer control system for a modular energy storage network. According to at least one embodiment, the power transfer control system includes a power transfer network and a processing module. The power transfer network has a first interface coupleable to one or more energy storage units and a second interface coupleable to one or more power conversion units. The power transfer network includes one or more conductors that are coupleable to the first interface and to the second interface for transferring power between one or more energy storage units and one or more power conversion units.

The processing module is configured to receive information indicating a power or energy supply or demand of an external system or information indicating an amount of energy stored in one or more energy storage units coupled to the first interface. Based at least in part on the received information, the processing module selectively causes one or more conductors of the power transfer network to electrically connect one or more of the energy storage units via the first interface to one or more of the power conversion units via the second interface and transfer power between the one or more energy storage units and the one or more power conversion units.

Additional aspects of a power transfer control system as disclosed herein are referenced above in relation to the energy storage system.

In yet other embodiments, disclosed herein is a computer-readable storage medium having computer-executable instructions stored thereon. The instructions, in response to execution by a computing device, cause the computing device to undertake actions. Such actions include receiving information indicating a power or energy supply or demand of an external system or information indicating an amount of energy stored in one or more energy storage units. Additionally, based at least in part on the received information, such actions include selectively causing one or more conductors of a power transfer network to electrically connect one or more of the energy storage units via a first interface of the power transfer network to one or more power conversion units via a second interface of the power transfer network. Power is then transferred between the one or more energy storage units and the one or more power conversion units.

The computing device may selectively cause a conductor in the power transfer network to electrically connect an energy storage unit to a power conversion unit based on an electrical characteristic of the energy storage unit. Alternatively, or in addition, the computing device may selectively cause a conductor in the power transfer network to electrically connect an energy storage unit to a power conversion unit based on an electrical characteristic of the power conversion unit.

The instructions in the computer-readable storage medium may cause the computing device to operate one or more switches in the power transfer network to selectively electrically connect the one or more conductors of the power transfer network to the one or more energy storage units and to the one or more power conversion units. Alternatively or in addition, the instructions may cause the computing device to control the power transfer between the one or more energy storage units and the one or more power conversion units using pulse-width modulation.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
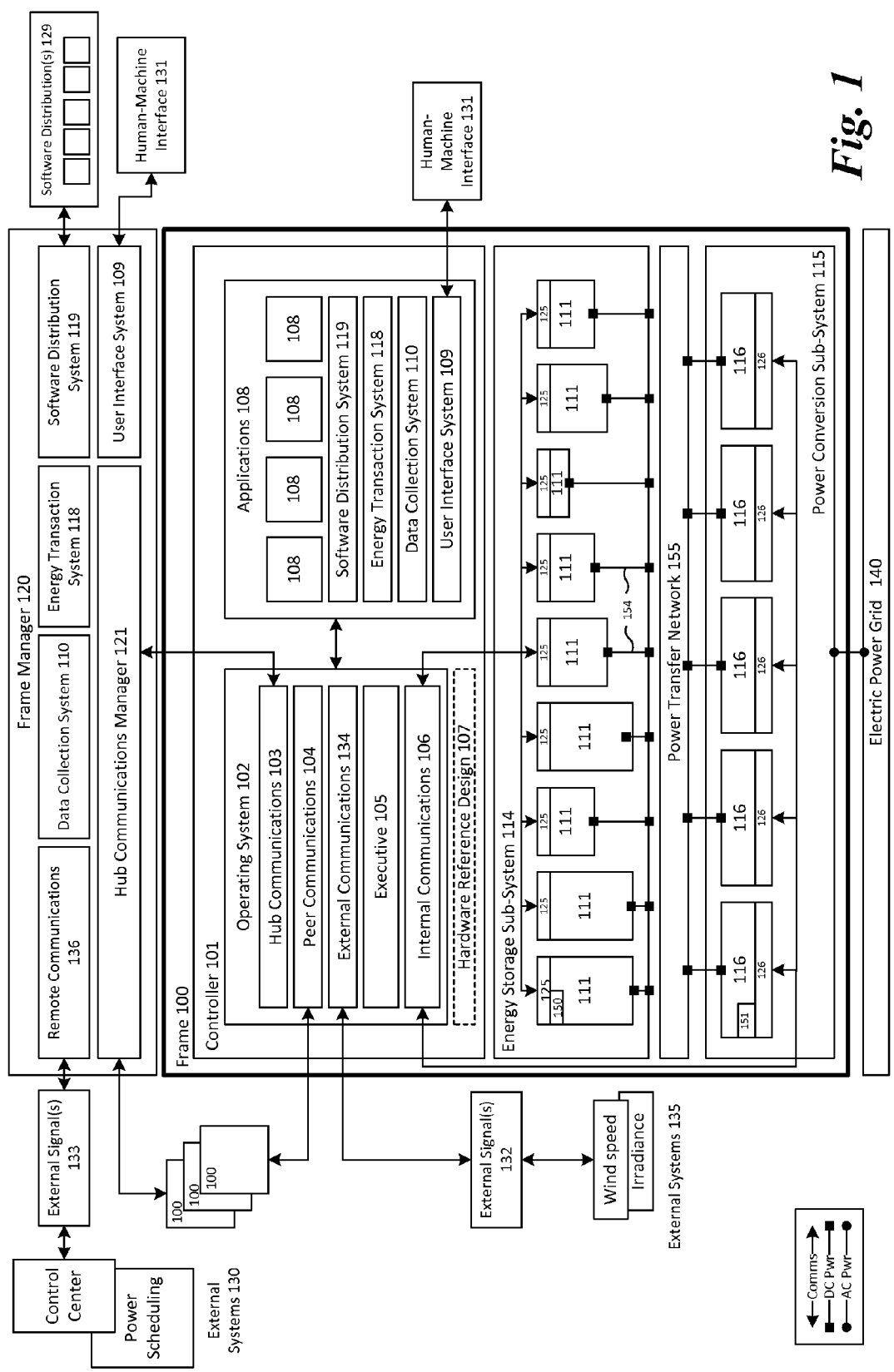
FIG. 1 is a block diagram illustrating an embodiment of an energy storage system.

In various embodiments, an energy storage system may house an energy storage medium or media; enable bi-directional power flow between itself and an electric power grid, including bi-directional power conversion between DC and AC power if required by the storage media; and enable communication with external systems, including electric utility software, to manage charging and discharging in a variety of scenarios. Example scenarios may include charging during times of excess power generation, discharging during times of peak demand, load-following, smoothing intermittent generation, supplying ancillary services such as frequency regulation, and supplying power in the event of outage.

Additionally, a modular battery energy storage system (MBESS) may provide support for a wide variety of battery cell and module types; provide support for a wide variety of inverter types; allow user-driven exchange, mixing, upgrade, expansion and re-use of modular sub-units; and accommodate technological changes in its component sub-systems, to let users exploit advances in technology, price-performance or other desired characteristics. In particular, an MBESS enables a user to choose best-of-breed component sub-systems, including storage, power conversion, monitoring, control and communications.

Thus, construction of a modular energy storage system, such as an MBESS, may include separable compatible components, including modular sub-units for storage, power conversion, monitoring, control and communications. These components may be developed independently by a multiplicity of component suppliers. Such a system exhibits scale modularity, which may be regarded as the capability to build small-, medium- or large-scale energy storage systems from a multiplicity of sub-units, which may be similar or identical modular sub-units, developed independently to common, open standards by a multiplicity of component suppliers.

A wide variety of battery cell and module types, including those noted above, and/or inverter types, both current and emerging, may be capable of scale modularity. Systems constructed from such components may be scaled to support a wide range of power (or energy) operating regimes, from a few kW (or kWh) to many MW (or MWh). In an electric power system, this corresponds to scaling from the neighborhood or community level to the substation level and beyond. Because of these advantages, deployment of energy storage systems may increase in coming years.

The embodiments described and recited herein pertain to a factored, open, and extensible energy storage architecture that delivers scale modularity and its attendant benefits to users, provides electric utilities and other customers with more competitive pricing, and facilitates flexibility and upgradability for accommodating current and future energy storage demands.

By factoring the energy storage system into separable compatible components or modules, an MBESS facilitates battery and/or inverter options that may be most appropriate for specific usage requirements. For example, as new battery technologies come to market, old battery units may be replaced without incurring the cost of replacing an entire storage system. Further, as battery units age, the user may choose to re-deploy older modular units to less stringent applications, where demands can be met with diminished storage capabilities.

As described and recited herein in various embodiments, a Modular Battery Energy Storage System (MBESS) may be configured as a factored system architecture to support a wide variety of battery cell and module types, current and emerging; support a wide variety of inverter types, current and emerging; accommodate rapid technological change in its component sub-systems; enable users to customize solutions in component sub-systems, including storage, power conversion and control, and thereby configure systems optimized to specific application needs; allow user-driven exchange, mixing, upgrade, expansion and re-use of modular sub-units; and enable individual sub-component manufacturers to focus on their individual specialties—batteries, inverters, electrical equipment, software, etc.

Thus, an MBESS may be implemented by combining general-purpose hardware and software components with application-specific components, typically implemented in software, for managing electric energy storage based on modular energy storage units such as batteries and/or modular power conversion units such as inverters.

Existing battery-based energy storage systems may be regarded as "monolithic" (as opposed to factored) and fail to exhibit some or all of the characteristics listed above.

Implementing an MBESS requires accommodating battery modules and/or inverter modules from multiple manufacturers, which may differ in voltage levels, charging or discharging capabilities, or other electrical and/or physical characteristics. This problem does not arise when implementing an ordinary, monolithic system.

Example System Description

In at least one implementation, an example MBESS comprises data center software communicatively connected with software and electronics embedded within electrical equipment for managing energy storage assets connected to an electricity distribution system, for example an electric utility distribution grid.

The example MBESS may include various components, such as Energy Storage Units (ESU) 111, Power Conversion Units (PCU) 116, and a Power Transfer Network 155, which are depicted in FIG. 1, and interoperate as follows:

The Energy Storage Units (ESU) 111 may be regarded as energy storage components of an MBESS, each comprising one or more energy storage devices, for example, battery cell(s) or ultra-capacitor(s). Each ESU 111 may be electrically DC-connected with a Power Transfer Network 155 (which may alternatively be referred to as an Intelligent DC Bus), via a hard-wired or switched connection, and communicatively connected with a Controller 101 via an Energy Storage Unit Interface 125 (contained within each ESU) and an Internal Communications 106 (contained within the Controller 101). Thus, an MBESS as illustrated enables user-driven selection, installation, removal, exchange, maintenance, monitoring, control, charging and discharging of individual ESUs.

An Energy Storage Sub-System 114 may comprise one or more ESUs, each of which may be DC-connected with a Power Conversion Sub-System 115 via the Power Transfer Network 155.

The Power Conversion Units (PCU) 116 may be regarded as power conversion components of an MBESS, converting AC power to DC power to charge ESUs from an external source, such as an electric power grid, and converting DC power to AC power in order to discharge ESUs to an external sink, such as an electric power grid. Each PCU 116 may comprise, for example, an AC-to-DC rectifier, a DC-to-AC inverter or both. Each PCU 116 may be electrically DC-connected with the Power Transfer Network 155 via a switch and communicatively connected with the Controller 101 via a Power Conversion Unit Interface 126 (contained within each PCU) and an Internal Communications 106 (contained within the Controller 101). Thus, an MBESS as illustrated enables user-driven selection, installation, removal, exchange, maintenance, monitoring and control of individual PCUs.

The Power Conversion Sub-System 115 may comprise one or more PCUs, each of which may be DC-connected with the Energy Storage Sub-System 114 via the Power Transfer Network 155 and AC-connected with an external system, such as an Electric Power Grid 140, possibly via multiple phases.

Figure 3:
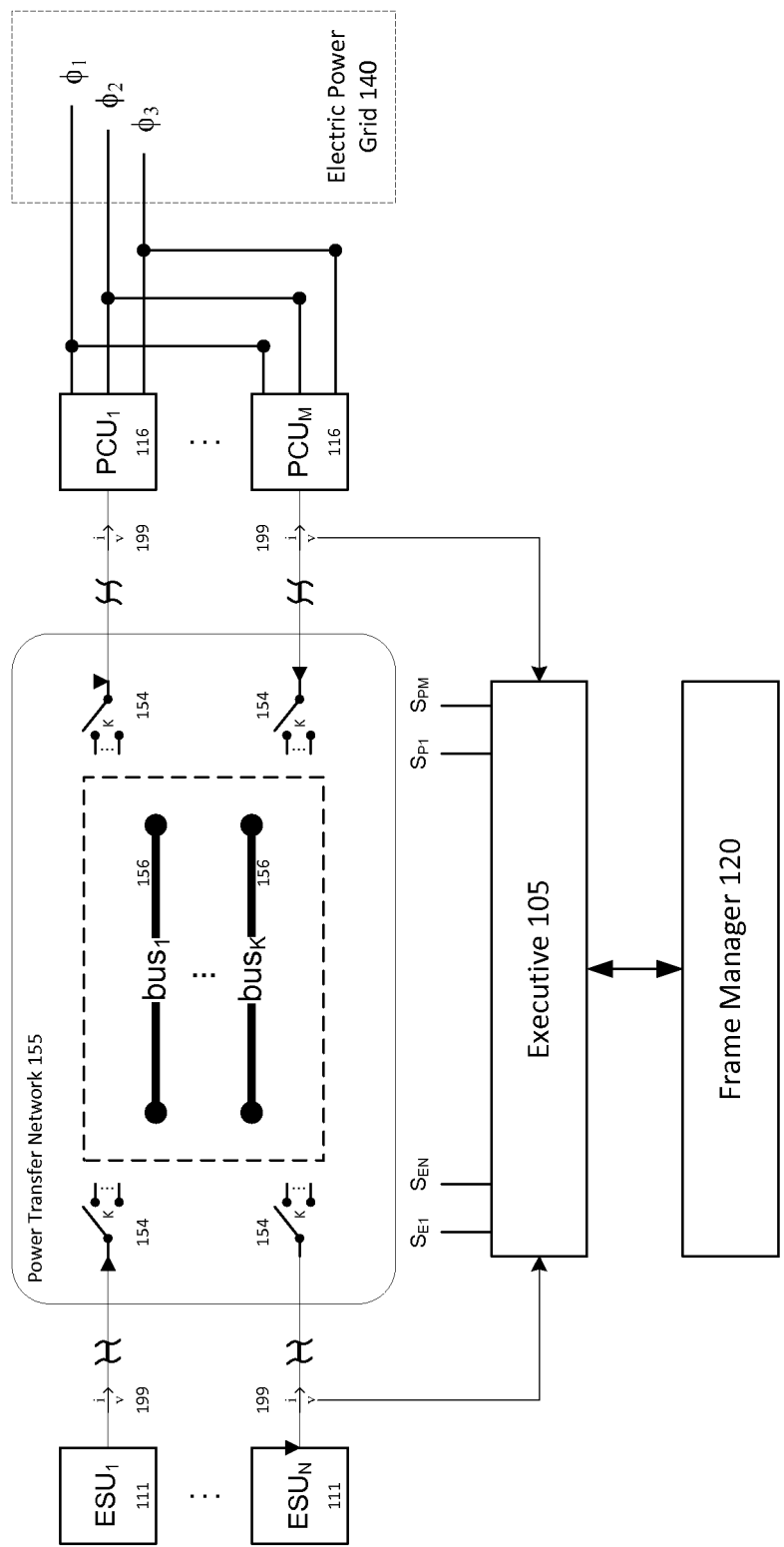
FIG. 3 is a block diagram illustrating an energy storage system showing detail of an embodiment of a power transfer network.

The Power Transfer Network 155 electrically connects the Energy Storage Sub-System 114 with the Power Conversion Sub-System 115, and in one implementation detailed in FIG. 3, the Power Transfer Network 155 may electrically connect one or more specific ESU(s) with one or more specific PCU(s).

An ESU Controller 150 (contained within each ESU) may communicate with an Executive 105 via the Energy Storage Unit Interface 125, enabling the Executive 105 and/or Applications 108 to individually or collectively control ESU actions, for example charging from, or discharging into, the Power Transfer Network 155.

A PCU Controller 151 (contained within each PCU) may communicate with the Executive 105 via the Power Conversion Unit Interface 126, enabling the Executive 105 and/or the Applications 108 to individually or collectively control PCU actions, for example accepting current from, or injecting current into, the Power Transfer Network 155 or the Electric Power Grid 140.

Switches 154 selectively electrically connect each ESU or PCU with the one or more conductors in the Power Transfer Network 155 via a first interface (for the ESUs) and via a second interface (for the PCUs). The Switches 154 may communicate with the Executive 105 via the ESU interface 125, the PCU interface 126 or other communication links.

The first interface of the Power Transfer Network 155 includes one or more modular points of connection, such as a plug, having specified electrical and physical characteristics. In such embodiments, the ESUs connecting to the first interface must conform to the specified electrical and physical characteristics for proper coupling to the Power Transfer Network 155. When ESUs are coupled to or decoupled from the first interface, a communication may be sent to the Executive 105 to indicate the addition or removal of the ESU and its electrical characteristics.

Likewise, the second interface of the Power Transfer Network includes one or more modular points of connection, such as a plug, with specified electrical and physical characteristics. In such embodiments, the PCUs connecting to the second interface must conform to the specified electrical and physical characteristics for proper coupling to the Power Transfer Network 155. When PCUs are coupled to or decoupled from the second interface, a communication may be sent to the Executive 105 to indicate the addition or removal of the PCU and its electrical characteristics. Accordingly, the Executive 105 may remain apprised of the available ESU and PCU resources in the energy storage system.

Figure 2:
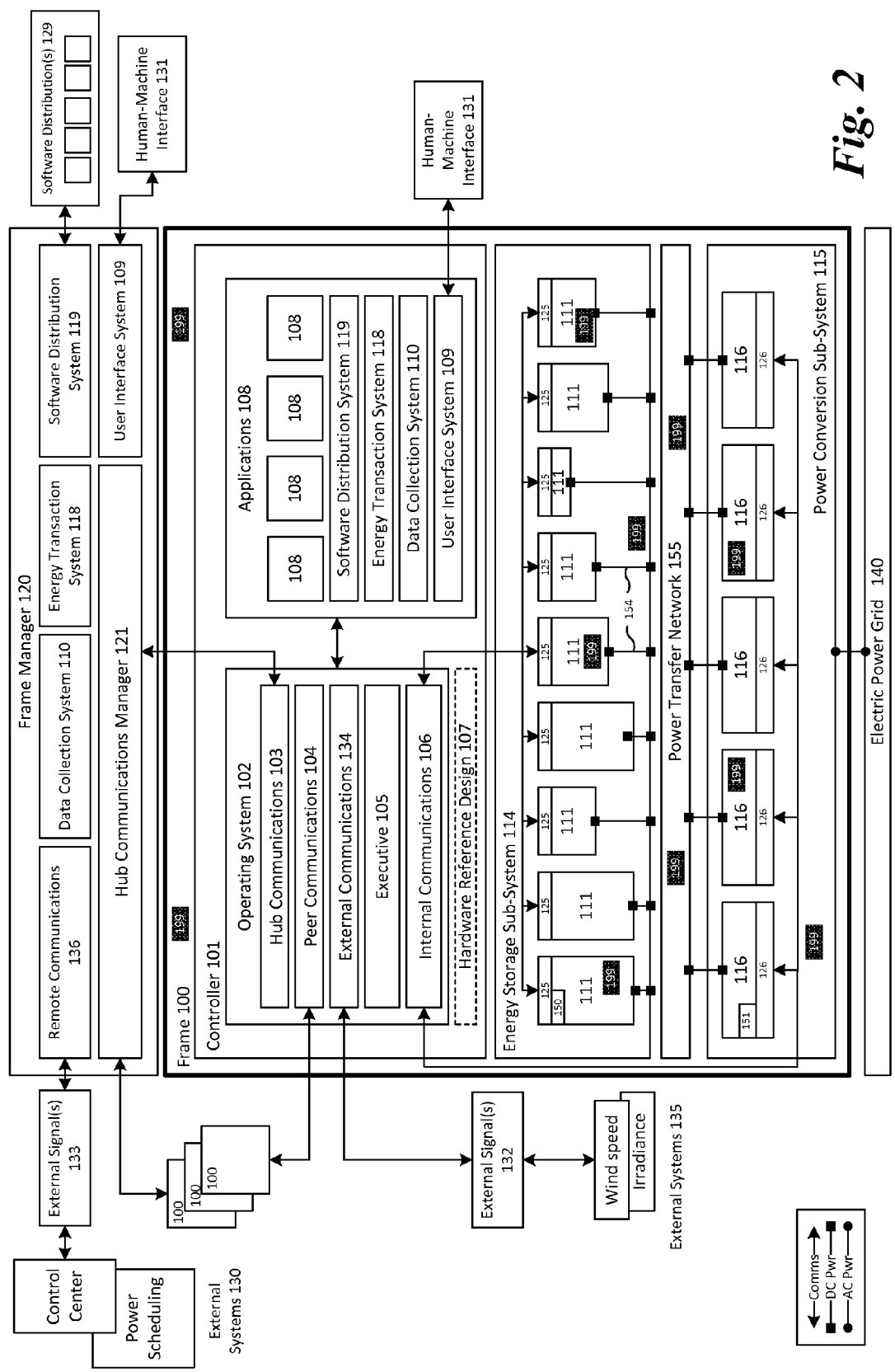
FIG. 2 is a block diagram illustrating the energy storage system of FIG. 1 with sensors.

Sensors 199, depicted for example in FIG. 2, may monitor voltage, current, power, temperature or other quantities of interest within the ESUs 111, the PCUs 116, the Energy Storage Sub-System 114, the Power Conversion Sub-System 115, the Power Transfer Network 155 or the Frame 100, and may communicate with the Executive 105 via the ESU interface 125, the PCU interface 126 or other communication links.

A Frame Manager 120 may comprise server application software and communications components of an MBESS network software system running on a general-purpose computer operating system within, e.g., a network data center. The Frame Manager 120 is communicatively connected to one or more Frames 100 via the internet or other network. A Frame 100 may comprise the physical, electrical, software and communications components of a single MBESS field installation, including a Controller 101 and its sub-components, the Energy Storage Sub-System 114 and its sub-components, and the Power Conversion Sub-System 115 and its sub-components.

In various implementations, the Frame Manager 120 may include a Hub Communications Manager 121, server-side components of client-server software applications, the Controller 101, and an Operating System 102, examples of which are described as follows:

The Hub Communications Manager 121 may communicatively connect the Frame Manager 120 and its sub-systems with one or more Frames 100 via instances of Hub Communications 103 within each Frame 100.

The server-side components of client-server software applications, e.g., a User Interface System 109, a Data Collection System 110, an Energy Transaction System 118 and a Software Distribution System 119, may interact with their respective client-side components running within one or more Frames 100 to implement application-specific features of an MBESS.

The Controller 101 may comprise the principal automation components of a Frame 100, including the Operating System 102 and its sub-components, a Hardware Reference Design 107 and Applications 108. In one implementation, the Controller 101 may be a general-purpose (perhaps embedded) computing system comprising off-the-shelf hardware and software augmented by MBESS-specific components.

The Operating System 102, in at least one implementation, may be regarded as the general-purpose computer operating system of the Controller 101 exposing a published general-purpose applications programming interface (API), for example an embedded version of the Linux or Windows operating system.

The MBESS-specific sub-components of the Operating System 102 may include components such as Hub Communications 103 and Peer Communications 104.

The Hub Communications 103 may be externally communicatively connected with the Hub Communications Manager 121, thereby enabling the Frame Manager 120 to remotely manage one or more Frames 100 via the internet or other network.

The Peer Communications 104 may be externally communicatively connected with one or more other instances of Peer Communications 104, each respectively contained within another instance of Frame 100, via a private or public network, thereby enabling a multiplicity of Frames 100 to interoperate as autonomous peers, independent of their connection with the Frame Manager 120.

The Executive 105 may be internally communicatively connected via Internal Communications 106 with one or more Energy Storage Units 111 within the Energy Storage Sub-System 114 and with one or more Power Conversion Units 116 within the Power Conversion Sub-System 115, thereby enabling user-driven selection, installation, removal, exchange, maintenance, monitoring, control, charging or discharging of individual ESUs or PCUs within Frame 100. Additionally, the Executive 105 monitors the ESU or PCU quantities of interest, for example state-of-charge (SOC), cycle life, calendar life, voltage, current, power or temperature, to enable differential charging or discharging of individual ESUs and thus optimize overall MBESS performance. In other embodiments, the Executive may be communicatively connected with the one or more Energy Storage Units 111 and/or the one or more Power Conversion Units 116 via an external network, such as the Internet or other network.

The Internal Communications 106 may be internally communicatively connected via the Energy Storage Unit Interface 125 with one or more ESUs within the Energy Storage Sub-System 114 and internally communicatively connected via the Power Conversion Unit Interface 126 with one or more PCUs within the Power Conversion Sub-System 115.

Hardware Reference Design 107, in at least one implementation, may be a hardware specification for a general-purpose computing system comprising off-the-shelf components.

Applications 108, in at least one implementation, may include multiple-sourced, including third-party, software applications that are compatible with the API exposed by Operating System 102.

In at least one implementation, the Applications 108 may include a User Interface System 109, a Data Collection System 110, an Energy Transaction System 118, and a Software Distribution System 119.

The User Interface System 109 may be a client-server application comprising a local software component running within the Applications 108 of a Frame 100 and a remote software component running within the Frame Manager 120, which may also interoperate with a Human-Machine Interface 131, to provide a local or remote operator user interface to the Frame 100 and its component sub-systems.

The Data Collection System 110 may be a client-server application comprising a local software component running within the Applications 108 of the Frame 100 and a remote software component running within the Frame Manager 120 that collects data on the performance and operation of the Frame 100 and its component sub-systems and transmits the data to the Frame Manager 120, where the data may be stored or further disseminated for purposes of record-keeping or analysis.

The Energy Transaction System 118 may be a client-server application comprising a local software component running within the Applications 108 of the Frame 100 and a remote software component running within the Frame Manager 120 that records energy and power transactions of the Frame 100 and its component sub-systems and transmits this information to the Frame Manager 120, where it may be used to enable economic measurements or support financial transactions among counterparties that own, host or receive services from one or more MBESSs as described herein.

The Software Distribution System 119 may be a client-server application comprising a local software component running within the Applications 108 of the Frame 100 and a remote software component running within the Frame Manager 120 that distributes software, such as a battery management system or inverter management system, from one or more ESU suppliers or PCU suppliers to the Executive 105 for use by the Executive 105 in managing ESUs within the Energy Storage Sub-System 114 or PCUs within the Power Conversion Sub-System 115. Software so distributed may, in at least one implementation, be provided as Software Distributions 129 by one or more ESU or PCU suppliers and installed by the Operating System 102 as a device driver subject to version control, maintenance and updating via mechanisms and techniques well-established for general-purpose computer operating systems.

The Energy Storage Sub-System 114 may be the energy storage sub-system of Frame 100, comprising in one example implementation Energy Storage Units 111 each communicatively connected via an Energy Storage Unit Interface 125 with an Internal Communications 106.

The ESUs 111 may consist of one or more types and sizes, provided by one or more ESU suppliers, and may have different electrical and/or physical characteristics.

The Energy Storage Unit Interface 125, in at least one implementation, may be a general-purpose network or computer-peripheral bus, such as Ethernet, Universal Serial Bus (USB) or Modbus, that communicatively connects an Energy Storage Unit 111 with a Controller 101 via the Internal Communications 106.

The Power Conversion Sub-System 115 is the power conversion (AC-DC and DC-AC) sub-system of the Frame 100, and may comprise, in at least one example implementation, Power Conversion Units 116, each of which may be communicatively connected via a Power Conversion Unit Interface 126 to an Internal Communications 106.

PCUs 116 may be of one or more types and sizes, provided by one or more PCU suppliers, and may have different electrical and/or physical characteristics.

The Power Conversion Unit Interface 126, in at least one implementation, may be a general-purpose network or computer-peripheral bus, such as a Universal Serial Bus (USB) or Modbus, that communicatively connects a Power Conversion Unit 116 with the Internal Communications 106.

The Power Conversion Sub-System 115 may enable virtual PCU connections (not depicted), which are directly analogous to virtual ESU connections.

A Human-Machine Interface 131, in at least one implementation, may comprise hardware and software components, such as a keyboard, mouse, display and corresponding device drivers, and serve as a local or remote operator user interface to the Frame 100 and its component sub-systems.

External Systems 130 may be regarded as any of a variety of systems or software applications, such as Control Center or Power Scheduling, external to an MBESS that may communicate with one or more Frames 100 via the Frame Manager 120, for example by transmitting External Signals 133. Thus, the External Systems 130 may remotely trigger MBESS charging and discharging in a variety of scenarios, including charging during times of excess power generation, discharging during times of peak demand, load-following, smoothing intermittent generation, supplying ancillary services such as frequency regulation, and supplying power in the event of outage.

External Systems 135 may be regarded as any of a variety of systems, such as wind speed or solar irradiance measurement devices, external to a Frame 100 that may communicate with the Frame 100 via External Communications 134, for example by transmitting External Signals 132. The Controller 101 may run an Application 108, which responds to an External Signal 132, to locally trigger charging or discharging of Energy Storage Units 111 in the Frame 100 in a variety of scenarios, including charging during times of excess power generation, discharging during times of peak demand, load-following, smoothing intermittent generation, supplying ancillary services such as frequency regulation, and supplying power in the event of outage.

In at least one implementation of an MBESS, communications interfaces between the Frame Manager 120 and Frames 100, as implemented by the Hub Communications Manager 121 and the Hub Communications 103, and between a Frame 100 and its Energy Storage Units 111 or Power Conversion Units 116, as implemented by the Energy Storage Unit Interface 125, the Power Conversion Unit Interface 126, the Executive 105, the Internal Communications 106 and the Software Distributions 129, may be specified, documented and published, to enable development of interoperable ESUs, PCUs and Frames by one or more different suppliers. Further, sub-components of an ESU 111, such as the ESU Controller 150, or sub-components of a PCU 116, such as the PCU Controller 151, Switches 154 or Sensors 199, may be implemented in various ways by one or more different suppliers, provided only that such sub-components conform to such published communications interfaces.

Features of a Modular Battery Energy Storage System (MBESS) may thus include:

Separable compatible components—MBESS components, for example, a Frame 100, Energy Storage Units (including example implementations 111), Power Conversion Units (including example implementations 116), Controller 101 and its sub-systems, Applications 108 (including example implementations 109, 110, 118 and 119), the Energy Storage Unit Interface 125, the Power Conversion Unit Interface 126 and Software Distributions 129, may be developed by one or more suppliers. By factoring the energy storage system into such separable compatible components, an MBESS may enable a user to configure a system and choose battery options most appropriate to specific requirements, replace or add new battery units without replacing the entire system, e.g., as new battery technologies come to market; or, re-deploy older Units to less stringent applications, when demands may be met with diminished capabilities, for example, as ESUs age.

Support for arbitrary battery types and chemistries—By implementing the Energy Storage Unit Interface 125 and enabling installable third-party software drivers delivered as Software Distributions 129 and managed by the Executive 105, an MBESS may enable different suppliers, e.g., manufacturers of batteries or ultra-capacitors, to develop and supply an MBESS-compatible ESU.

Optimization via differential management—By monitoring ESU or PCU quantities of interest, for example state-of-charge (SOC), cycle life, calendar life, voltage, current, power or temperature, the Executive 105 may enable differential charging or discharging of individual ESUs or PCUs to optimize overall MBESS performance.

Unit-frame interface—By factoring a Frame 100 into separable compatible components connected via defined interfaces, including the Energy Storage Unit Interface 125, the Power Conversion Unit Interface 126 and software drivers delivered as Software Distributions 129 and managed by the Executive 105, an MBESS may enable compatible units (ESU or PCU) to function within any compatible Frame 100, wherein such units and Frames may be developed by one or more suppliers.

Virtual Units—The Energy Storage Sub-System 114 and the Power Conversion Sub-System 115, respectively, may enable the logical and electrical inclusion of one or more ESUs or PCUs housed physically separated from their Frame 100.

Implementation

In one implementation, an MBESS can be implemented as a combination of commercially available batteries and inverters, software running on general-purpose computing systems, such as Windows- or Linux-based servers in an internet-connected data center, and embedded hardware, software and communications incorporated into electrical assets deployed in an electricity transmission or distribution system or on customer premises for purposes of electric energy storage.

ESUs 111 and PCUs 116 are readily available as commercial battery and inverter products in a wide variety of configurations and capabilities. In a preferred implementation, each ESU 111 or PCU 116 is utility grade, though either may also be of commercial or other grade for some implementations.

Memory within the MBESS may take many forms, though a non-volatile memory is preferred.

Communication between an MBESS data center and one or more fielded MBESSs can occur over any available communication channel or combination of channels and may involve other components, such as a utility-owned or customer-owned wired or wireless network.

The Controller 101 collects and stores data for each ESU 111 and PCU 116 including, without limitation, minimum voltage, maximum voltage and maximum current; and, additionally for each ESU, charge profile, discharge profile, maximum charge rate, maximum discharge rate and total energy capacity.

Power Transfer Network

Implementing an MBESS requires accommodating battery modules and/or inverter modules from multiple manufacturers, which may differ in voltage levels, charging or discharging capabilities, or other operating characteristics.

An MBESS may implement a power transfer network to enable segregating groups of ESUs and PCUs with common operating characteristics, wherein each such group is allocated one or more electrical conductors or buses within the power transfer network for a desired time period.

Figure 10:
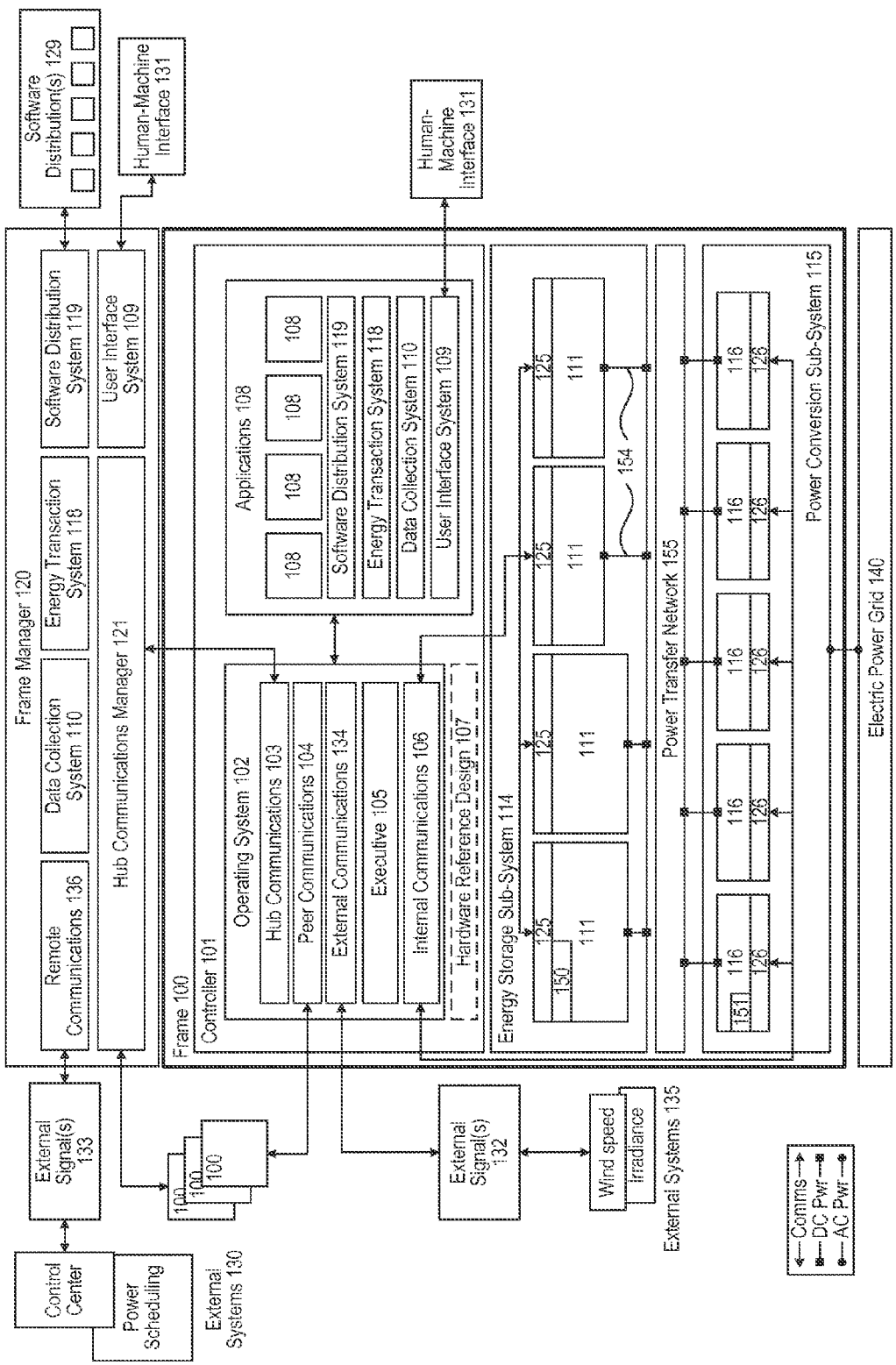
FIG. 10 is a block diagram illustrating an energy storage system showing detail of an embodiment of a power transfer network having more power conversion units than energy storage units.

In one general implementation (e.g., as shown in FIG. 3), each individual ESU or PCU connects electrically with the one or more power transfer network buses via a first interface (for the ESUs) or via a second interface (for the PCUs) using, in this implementation, a multi-way switch, with output cardinality equal to the number of buses. FIG. 3 depicts one implementation of such a switched power transfer network, comprising (N) ESUs 111 and (M) PCUs 116 connected by a power transfer network 155 of (K) buses 156. Each ESU 111 and PCU 116 is equipped with voltage and current sensors 199, and a K-way switch (or switch network) which enables connecting the ESU or PCU with one or more of the K buses 154. For ease of reference, this is referred to as an NKM implementation of an MBESS. FIG. 10 depicts an implementation substantially similar to FIG. 3, the primary difference being that FIG. 10 explicitly depicts an energy storage system comprising more PCUs 116 than ESUs 111, as mentioned previously herein.

Figure 4:
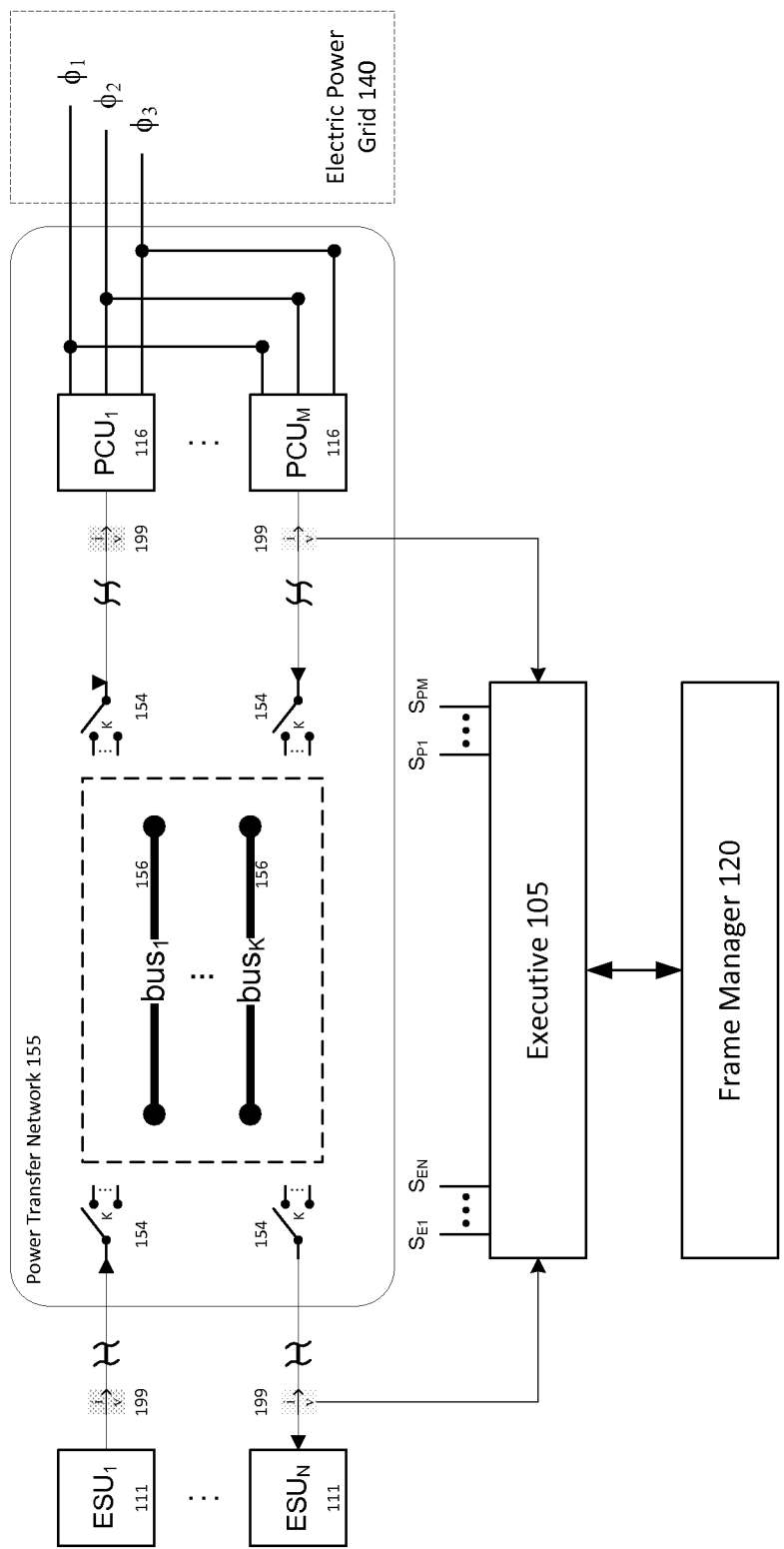
FIG. 4 is a block diagram illustrating an energy storage system showing another embodiment of a power transfer network.

In a variant general implementation (e.g., as shown in FIG. 4), the Power Transfer Network 155 integrates the PCUs 116 such that the MBESS itself—rather than individual PCU(s) 116—may act as a unitary AC source or load for the Electric Power Grid 140. For ease of reference, this implementation is referred to as an "NKM-integrated" implementation.

Methods of interconnecting ESUs and PCUs include solid state switches (e.g., IGBTs or FETs), mechanical relays, DC/DC converters, DC/AC converters or a combination of such. The interconnection stage may include voltage and current sensors 199 for each ESU and PCU connection. The Executive 105, by way of communication connections via the Internal Communications 106, may monitor the voltage and current sensors 199, and the results of said monitoring may be used by the Executive 105 or Applications 108 to inform control actions, for example regulating charging current into or discharging current from each ESU.

In most embodiments, the Power Transfer Network 155 connects multiple ESUs 111 with multiple PCUs 116 via multiple conductors or buses 156. For flexibility, the capacity of each ESU connection may be 3*TC/N, where TC is the total current capacity of ESUs 111 and N (as above) is the total number of ESUs. Similarly, the number (M) of PCUs 116 might be 5 or 10 times the number of ESUs 111 (e.g. M=5*N or M=10*N), to support a variety of ESU capacities.

Timing Control

For most embodiments discussed herein, the Controller 101 interfaces with the PCU(s) 116 in a manner that simulates a single ESU 111. The Executive 105 or Applications 108, running within the Controller 101, may manage relative timing of individual ESU and/or PCU currents.

For example, ESU interconnects may be staggered in time to spread out the switching currents and thereby optimize the load on the system (e.g., by reducing stress on components, EMI, etc.).

Figure 5:
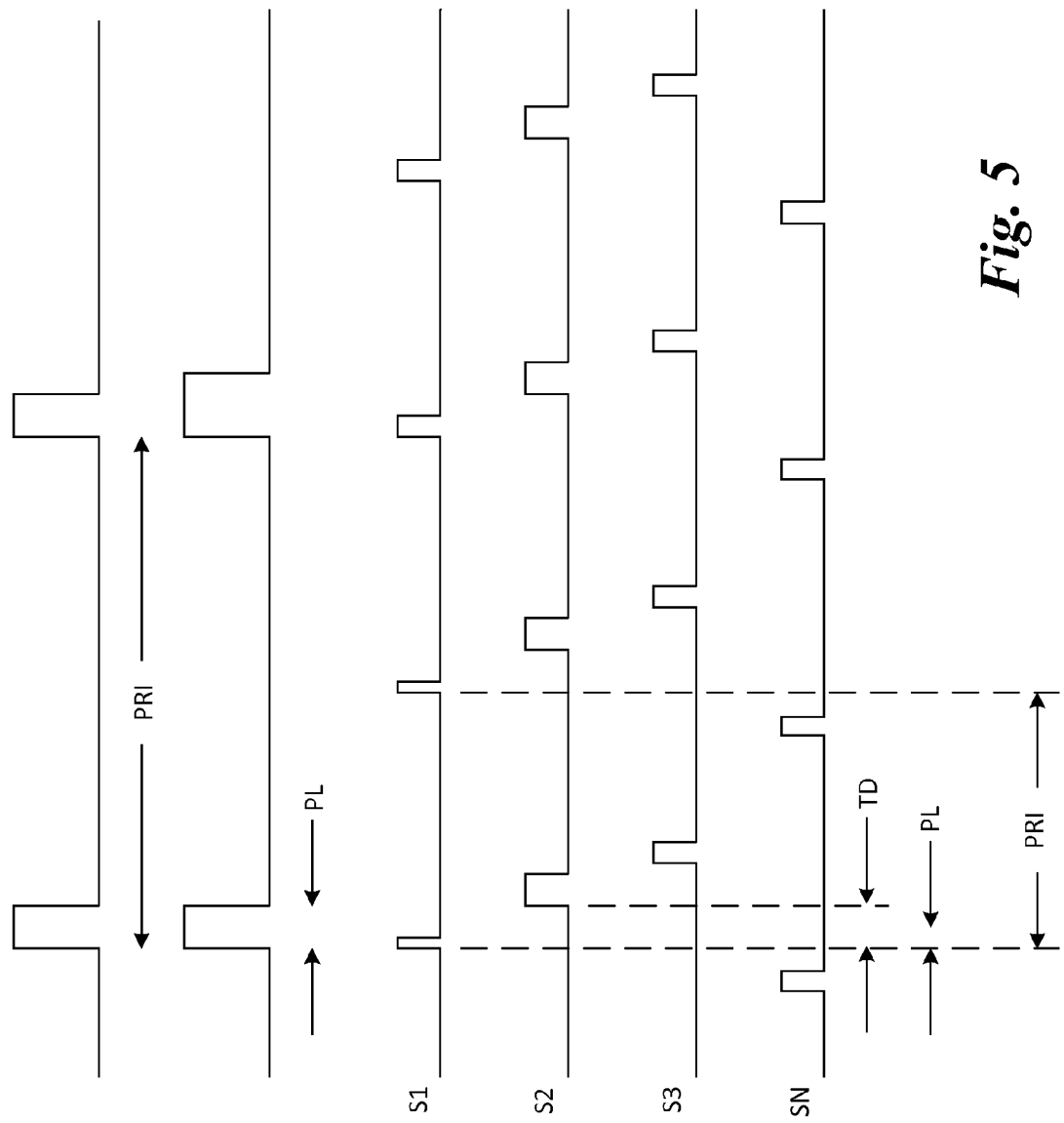
FIG. 5 is waveform diagram illustrating timing terminology used herein.

FIG. 5 introduces certain timing terminology used herein. The waveforms represent switch-on (rising) and switch-off (falling) events for the respective ESU connections. The Pulse Rate Interval (PRI) is the time between switch-on pulses in a repetitive switching pattern. The Pulse Length (PL) is the time for which a given ESU is connected. If the connection is simply switched, then the duty cycle would be PL/PRI. With other connection mechanisms, for example DC/DC converters, the duty cycle may be less. The time delay (TD) between ESU connect events for different ESUs are staggered to spread out the switching energy, resulting in lower stress on components, lower ripple effects, and lower radiated and conducted emissions.

Figure 6:
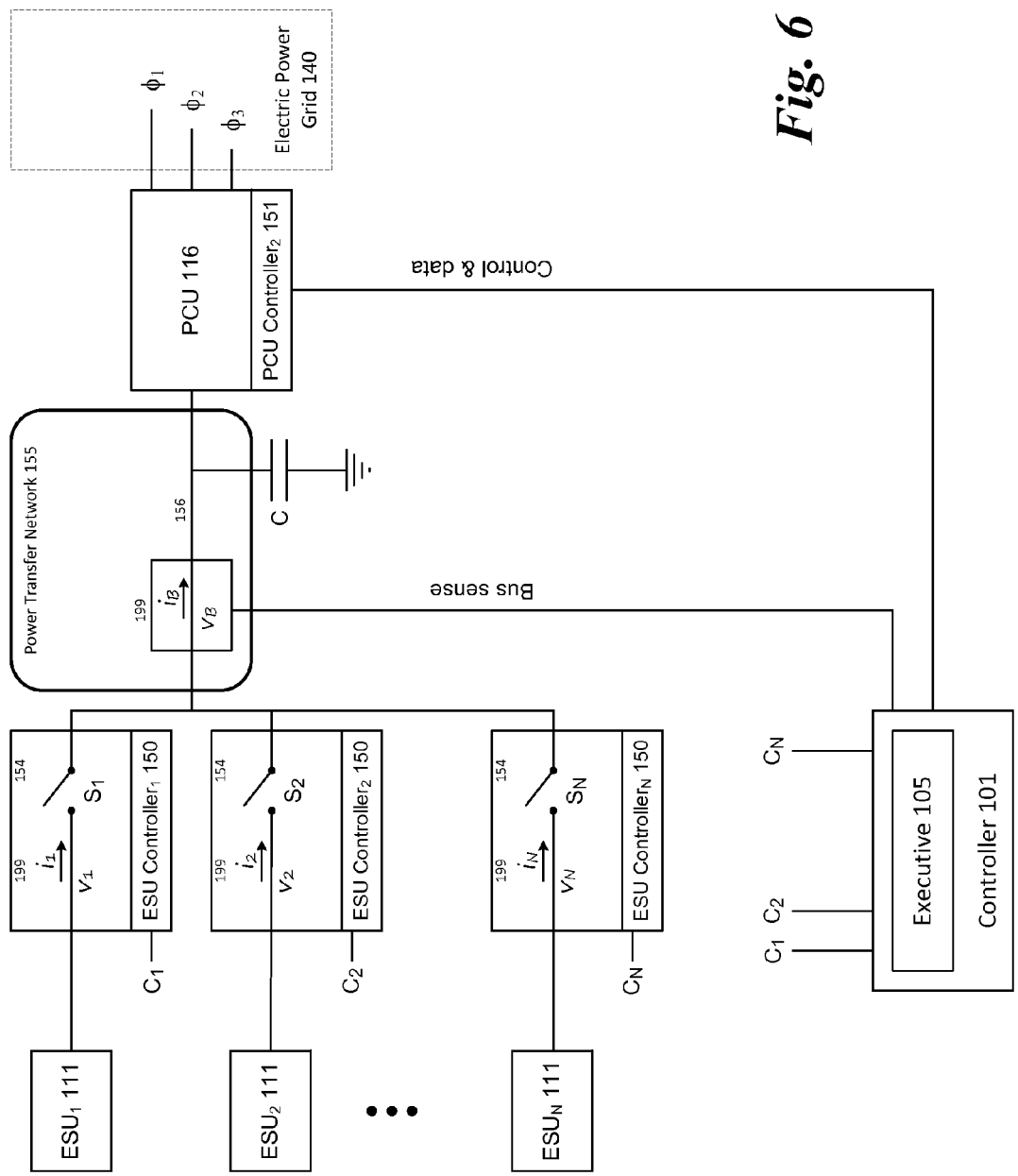
FIG. 6 is a block diagram illustrating an implementation of an energy storage system with a single bus and switches.

In FIG. 5, the waveform S1 is a signal communicated to ESU Controller$_1$ 150 that controls the switch S1 coupled to ESU$_1$ (see FIG. 6). Similarly, the waveform S2 is a signal communicated to ESU Controller$_2$ 150 that controls the switch S2 coupled to ESU$_2$, the waveform S3 is a signal communicated to ESU Controller$_3$ 150 that controls the switch S3 coupled to ESU$_3$, and so forth, with the waveform SN is a signal communicated to ESU Controller$_N$ 150 that controls the switch SN coupled to ESU$_N$. In situations of charging the energy storage units, where multiple ESUs 111 are connected to a single PCU 116, the waveforms illustrate a way for all of the power being transferred to be first sent to ESU$_1$, and then ESU$_2$, etc. When the coupling of the power transfer bus 156 changes from ESU$_1$ to ESU$_2$, etc., the switches may be held open for a period of time. That way the full power may be transferred to each ESU, but transferring energy only for appropriate intervals to address any problems with differential charging.

The following subsections describe various specific implementations for single bus and switches; single bus and DC/DC converters; multiple bus and DC/DC converters; and parallel PCUs.

Single Bus and Switches

A specific embodiment of the general NKM implementation (FIG. 3) is an N-1-1 MBESS, comprising (N) ESUs 111 and one PCU 116, connected by a power transfer network 155 with a single conductor or bus 156 (FIG. 6). Each ESU may be (dis)connected (from) to bus 156 by a Switch 154 via an ESU Controller 150, upon command of the Executive 105 or Applications 108, running within the Controller 101. The ESU Controller 150 may, upon command, also report readings from voltage or current sensors 199.

Additionally, the Executive 105 or Applications 108 may, via a PCU Controller 151, command PCU 116 to flow current at a given level to or from an external Electric Power Grid 140. This command may be informed by readings gathered from the voltage or current sensors 199 attached to bus 156 or embedded within the ESU Controller(s) 150.

In an N-1-1 MBESS, the switches 154 and the power transfer network 155 effectively comprise a device residing between the ESU(s) 111 and PCU 116, and enable external current control of the ESU(s) 111 via commands sent to the PCU Controller 151.

In the preferred embodiment, the switches 154 are solid state devices (e.g. FETs). For lower-speed applications, mechanical relays may be used. Dominant requirements for the switches 154 are low on-resistance and fast switching time. The switches 154 are controlled with a pulse-width-modulated signal, whose duty cycle may vary from 0% to 100%. When a switch 154 is closed, its ESU 111 is connected to the DC side of PCU 116 (via bus 156) and current is able to flow. A connected ESU 116 (dis)charges when the bus 156 is at a voltage (less)greater than the ESU's terminal voltage. The Executive 105 or Applications 108 may, via the PCU Controller 151, monitor the state of each ESU 111 and may disable any malfunctioning ESU. In a charge mode, the bus 156 DC voltage is set higher than the maximum ESU voltage, so that ESU currents flow in the appropriate direction. In a discharge mode, the bus 156 capacitance must be such that bus 156 voltage is always lower than the minimum ESU voltage to ensure proper current flow.

If all ESUs 111 have equivalent voltage and current characteristics, then the switches 154 may be on at the same time without issue. If ESU voltage and current characteristics differ sufficiently, it may be required that only one ESU type is connected at any time. Consider, for example, an MBESS with two types of ESUs, each comprising 50% of total system capacity, and of sufficiently different voltage and current characteristics that only one ESU type may be connected to the PCU 116 via the bus 156 at a time. A bus time-sharing scheme may be used to charge or discharge the MBESS at a desired rate (for example, 1C) while adhering to a fixed charge/discharge limit for each ESU type (for example, 1C). In this case, each ESU type could be connected at a 50% duty cycle and charged/discharged at a 2C rate, resulting in an average 1C rate for an individual ESU. The PRI would be set to a value such that the ESUs are not adversely affected by the elevated instantaneous charge/discharge rate. In some cases, the bus 156 DC voltage may need to settle between the ESU connections, requiring the duty cycle to be slightly less than 50% (e.g. 45%). In such cases, instantaneous C rates for each ESU type could be adjusted accordingly to maintain an overall MBESS rate of 1C.

Single Bus and DC/DC Converters

Figure 7:
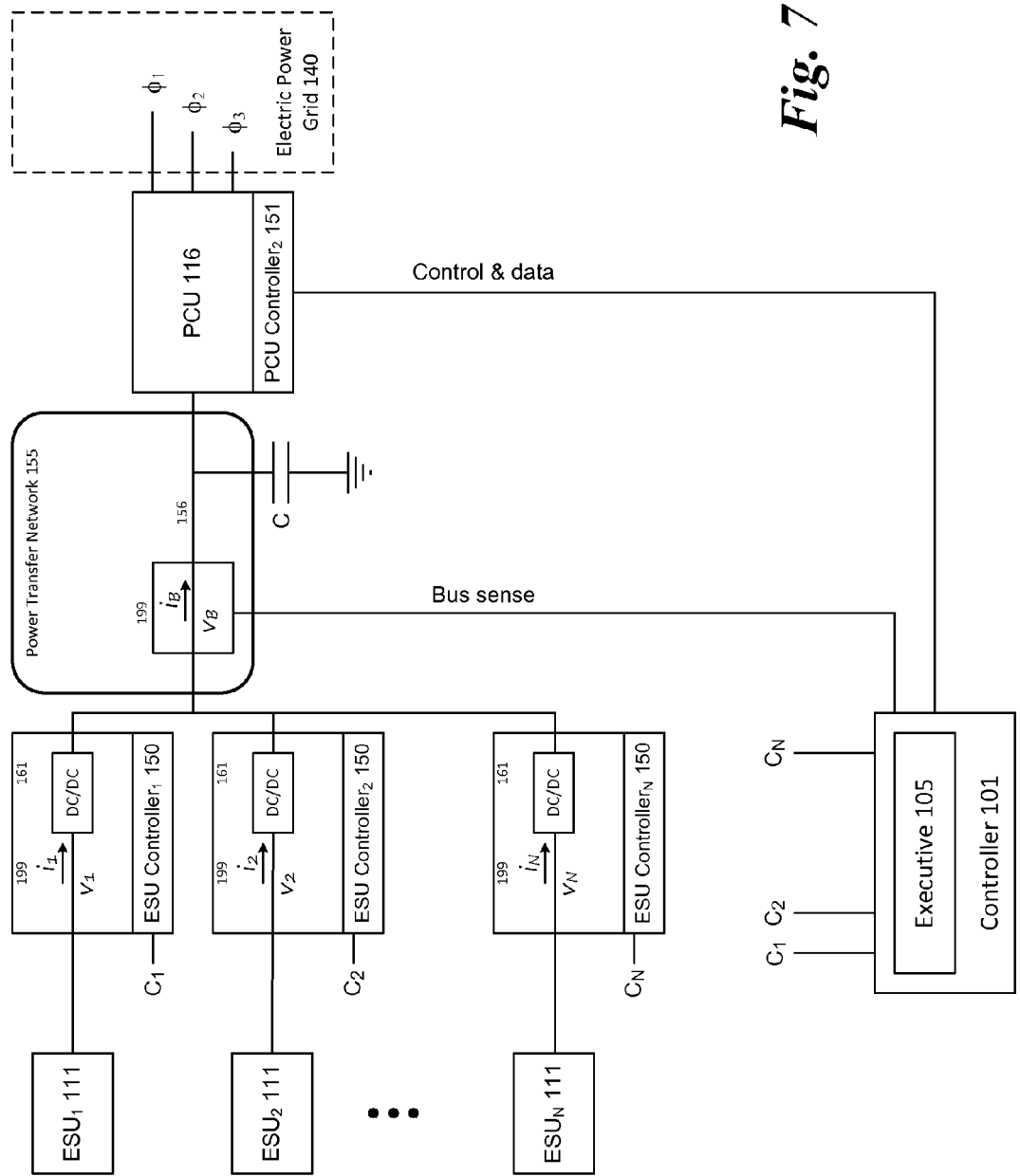
FIG. 7 is a block diagram illustrating another implementation of an energy storage system with a single bus and DC/DC converters.

In another specific N-1-1 embodiment, each switch 154 may be replaced with a DC/DC converter 161 (e.g., as shown in FIG. 7).

In this implementation, individual ESU voltages may, via the DC/DC converter, be stepped up to (discharge mode) or down from (charge mode) a common intermediate DC voltage on the bus 156 connected with the PCU 116. This implementation may be more efficient and controllable than the switched bus time-sharing scheme described above, as the DC bus voltage may be set to a desired level and shared simultaneously across all ESUs 111. In at least one implementation, a voltage between the maximum ESU voltage requirement and the line voltage requirement would be used.

Multiple Bus and DC/DC Converters

Figure 8:
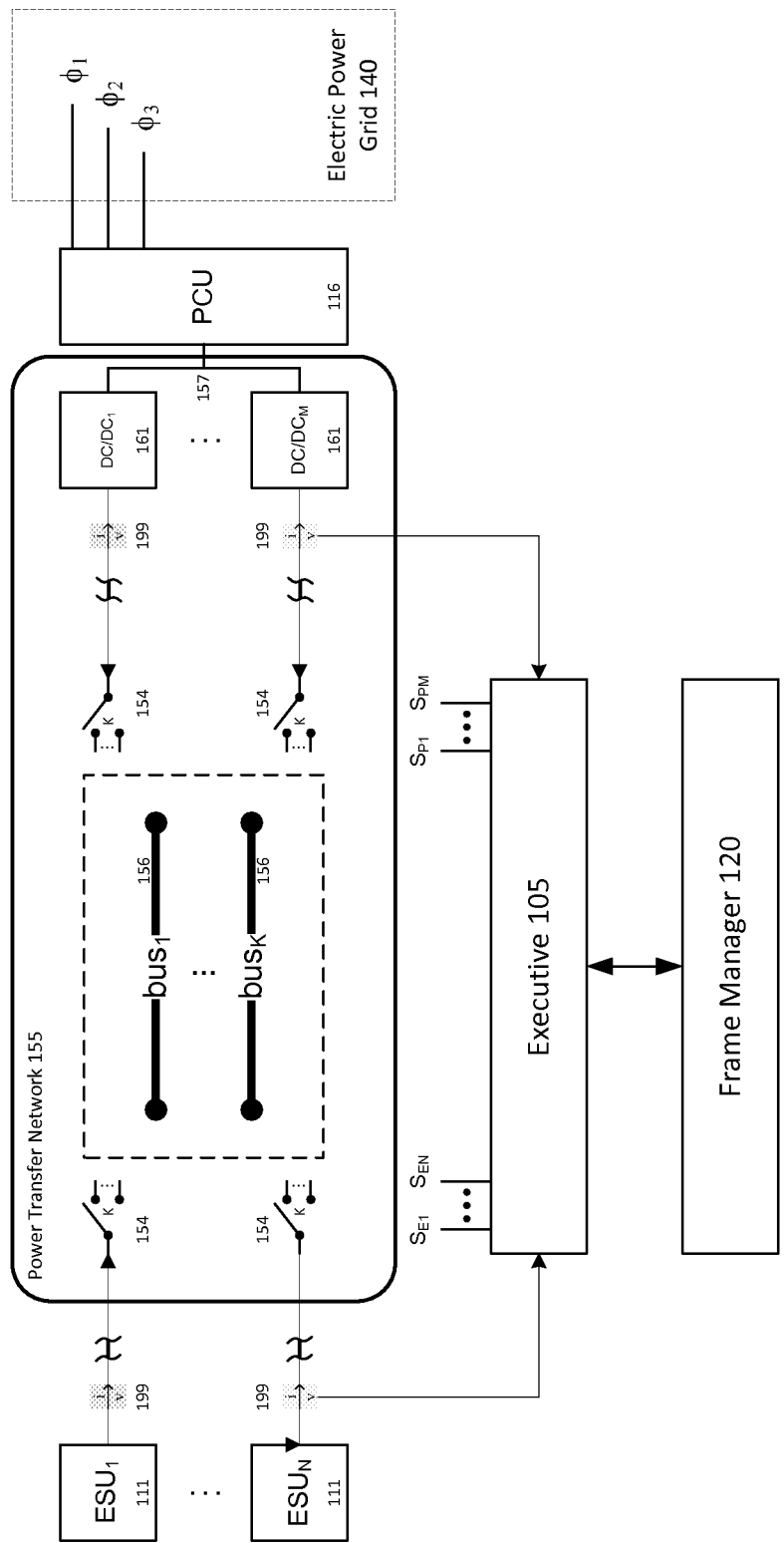
FIG. 8 is a block diagram illustrating another implementation of an energy storage system including multiple buses, multiple switched DC/DC converters, and a single DC bus connected with a power conversion unit.

In another embodiment, the Power Transfer Network 155 may include multiple switched ESUs 111, multiple conductors or buses, multiple switched DC/DC converters and a single DC bus connected with a single PCU 116 (e.g., as shown in FIG. 8).

This embodiment is a variant of the NKM implementation earlier described, with N ESUs 111, K buses 156, M DC/DC converters 161 and a single PCU 116. To better accommodate multiple ESU types and charge/discharge rates, the number M of DC/DC converters may be much larger than the number N of ESUs, allowing the converters to be ganged together as necessary for each ESU type. Alternatively, DC/DC converters may be overdesigned (in current-carrying capacity) and connected one-to-one with ESUs (M=N). In this configuration, the maximum capacity of a given ESU might be limited (e.g. 20% of total for a 10-ESU system to allow some flexibility).

Parallel PCUs

Figure 9:
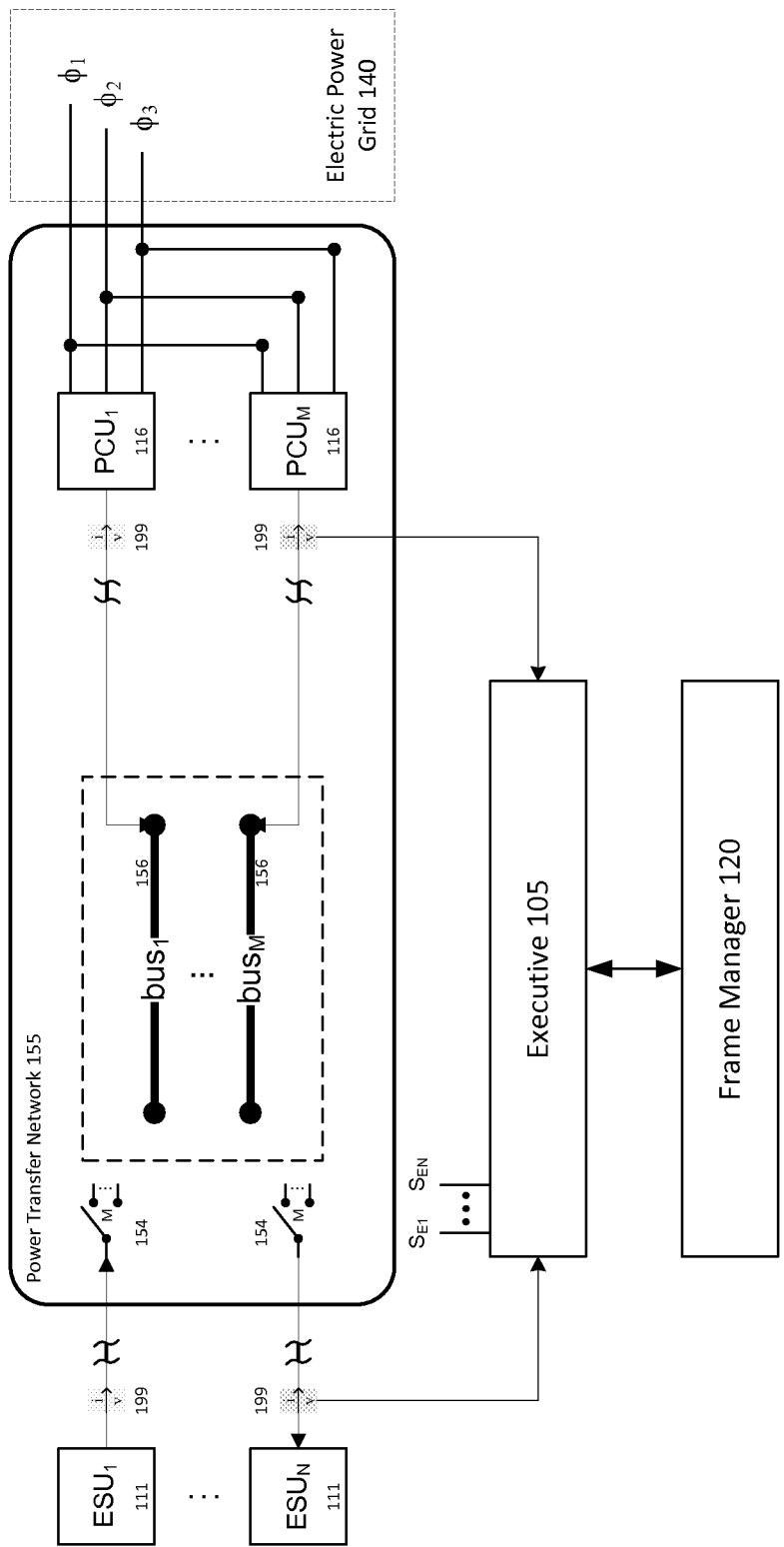
FIG. 9 is a block diagram illustrating another implementation of an energy storage system that incorporates parallel power conversion units and sums their outputs, e.g., for an external electric power grid.

Another embodiment incorporates parallel PCUs and sums their outputs at the external Electric Power Grid 140 (e.g., as shown in FIG. 9). This implementation is a specialization of the general NKM-integrated MBESS (FIG. 4) in which each of the M PCUs is hard-wired (not switched) to a single bus, and each of the N ESUs may be switch-connected with any of the M buses.

The switches 154 are static after the system is configured, so the switching technology need not be fast. For maximum flexibility (e.g., many ESU types), the number of PCUs may be significantly higher than the number of ESUs (e.g., 10:1 PCU-to-ESU ratio). Alternatively, if there are relatively few distinct ESU types, the most desired configurations may be supported by one PCU per ESU type (e.g., 1:3 PCU-to-ESU ratio).

Implementation

Implementing an MBESS is a straightforward task for practitioners skilled in the art, given the information herein. Provided as follows are various example scenarios.

Example Scenario 1

Add or Replace Energy Storage Unit

In one example scenario, an MBESS user, e.g., an electric utility employee, may add or replace an ESU within a Frame 100, for example to upgrade or maintain the capability of the Frame 100. Using the Human-Machine Interface 131, the user may identify the location within the Energy Storage Sub-System 114 where the ESU will be added or replaced. Upon receiving this information, the Controller 101 may cause the Energy Storage Sub-System 114 to electrically disable the affected location, to ensure the user's safety. After adding or replacing the ESU, the user may register, via the Human-Machine Interface 131, completion of the operation. Upon receiving this information, augmented by appropriate fail-safe checks, the Controller 101 may cause the Energy Storage Sub-System 114 to electrically enable the affected location.

Example Scenario 2

Add or Replace Power Conversion Unit

In a second example scenario, an MBESS user, e.g., an electric utility employee, may add or replace a PCU within a Frame 100, interacting with the Power Conversion Sub-System 115 in a manner analogous to the above-described interaction with the Energy Storage Sub-System 114 in Example Scenario 1.

Example Scenario 3

Charge or Discharge in Response to Local Signal

In a third example scenario, a Frame 100 may charge from or discharge to an Electric Power Grid 140 in response to an External Signal 132 received from an External System 135. The External Signal 132 may, for example, indicate an increase or decrease in local solar irradiance, and may be augmented by contemporaneous readings received from neighboring Frames 100 via Peer Communications 104. Upon receiving this information, the Controller 101 may cause the Energy Storage Sub-System 114 to charge (e.g., in the event of an increase in local solar irradiance) or discharge (e.g., in the event of a decrease in local solar irradiance).

Example Scenario 4

Charge or Discharge in Response to Remote Signal

In a fourth example scenario analogous to the third example scenario, a Frame 100 may charge from or discharge to an Electric Power Grid 140 in response to an External Signal 133 received from an External System 130 via the Frame Manager 120. The External Signal 133 may, for example, indicate a command or request emanating from a control center or power scheduling system. Upon receiving this signal, the Controller 101 may cause the Energy Storage Sub-System 114 to charge, discharge or await further signal (s), in accordance with the specific command or request received.

Example Scenario 5

Discharge to Islanded Microgrid in Response to Signal

In a fifth example scenario, a Frame 100 may discharge to an islanded microgrid, such as a sub-network of an Electric Power Grid 140, in response to a signal indicating that the sub-network has been isolated from the main grid. The signal may be, for example, an External Signal 133 received from an External System 130 via the Frame Manager 120, an External Signal 132 received from an External System 135, or a peer signal from another Frame 100 received via Peer Communication 104. Upon receiving the signal, the Controller 101 may cause the Energy Storage Sub-System 114 to discharge to the islanded microgrid until its charging capability is depleted to the lowest acceptable level, or until another signal is received indicating that the affected microgrid is no longer isolated.

GENERALITY OF APPLICATION

An MBESS as described herein is generally applicable to many permutations, combinations and variations on the implementations and example scenarios described above. While illustrative embodiments have been illustrated and described, it will be appreciated that various changes can be made therein without departing from the spirit and scope of the invention.

The embodiments of the invention in which an exclusive property or privilege is claimed are defined as follows:

1. An energy storage system, comprising:
   one or more energy storage units;
   one or more power conversion units coupleable to an external system;
   a power transfer network coupled to the one or more energy storage units via a first interface and to the one or more power conversion units via a second interface, wherein the power transfer network includes one or more conductors that are coupleable to the first interface and to the second interface for transferring power between the one or more energy storage units and the one or more power conversion units, wherein the power conversion units are configured to convert an electrical parameter of power transferred to and from the energy storage units in accordance with an electrical requirement of the external system or the one or more energy storage units; and
   a controller in communication with the power transfer network, wherein the controller is configured to selectively cause one or more of the conductors in the power transfer network to electrically connect one or more of the energy storage units to one or more of the power conversion units based at least in part on a power or energy demand of the external system and an age of the one or more energy storage units such that older energy storage units are connected to external systems having lower power or energy demands.

2. The energy storage system of claim 1, wherein at least one of the energy storage units differs from another of the energy storage units with regard to an electrical characteristic.

3. The energy storage system of claim 2, wherein the electrical characteristic is at least one of energy capacity, power capacity, current capacity, or voltage.

4. The energy storage system of claim 1, wherein at least one of the energy storage units differs from another of the energy storage units with regard to a physical characteristic.

5. The energy storage system of claim 1, wherein at least one of the power conversion units differs from another of the power conversion units with regard to an electrical characteristic.

6. The energy storage system of claim 5, wherein the electrical characteristic is at least one of power capacity, current capacity, or voltage.

7. The energy storage system of claim 1, wherein at least one of the power conversion units differs from another of the power conversion units with regard to a physical characteristic.

8. The energy storage system of claim 1, wherein the energy storage system comprises more energy storage units than power conversion units.

9. The energy storage system of claim 1, wherein the energy storage system comprises more power conversion units than energy storage units.

10. The energy storage system of claim 1, wherein the one or more power conversion units are coupleable to a power grid operated by an electric utility.

11. The energy storage system of claim 1, wherein the controller is configured to communicate with the power transfer network using a standardized, publicly available protocol.

12. The energy storage system of claim 1, wherein the controller is further configured to communicate with one or more of the energy storage units.

13. The energy storage system of claim 1, wherein the controller is further configured to communicate with one or more of the power conversion units.

14. The energy storage system of claim 1, wherein the controller is further configured to communicate with a controller of another energy storage system according to claim 1.

15. The energy storage system of claim 1, wherein at least one of the energy storage units is housed physically separate from another energy storage unit in the energy storage system.

16. The energy storage system of claim 1, wherein at least one of the power conversion units is housed physically separate from another power conversion unit in the energy storage system.

17. The energy storage system of claim 1, wherein the controller selectively causes a conductor in the power transfer network to electrically connect an energy storage unit to a power conversion unit based on an electrical characteristic of the energy storage unit.

18. The energy storage system of claim 17, wherein the electrical characteristic of the energy storage unit is at least one of state-of-charge, cycle life, calendar life, voltage, current, power or temperature.

19. The energy storage system of claim 1, wherein the controller selectively causes a conductor in the power transfer network to electrically connect an energy storage unit to a power conversion unit based on an electrical characteristic of the power conversion unit.

20. The energy storage system of claim 19, wherein the electrical characteristic of the power conversion unit is at least one of instantaneous voltage, instantaneous current, or instantaneous power.

21. The energy storage system of claim 1, wherein the one or more energy storage units or the one or more power conversion units are classified according to an operational attribute characterizing their ability to electrically connect to a common conductor in the power transfer network.

22. The energy storage system of claim 1, wherein the power transfer network includes one or more switches that are responsive to the controller to selectively electrically connect a conductor in the power transfer network to an energy storage unit and to a power conversion unit.

23. The energy storage system of claim 1, wherein the first interface defines one or more modular points of connection with specified electrical and physical characteristics to which the one or more energy storage units conform for coupling to the power transfer network.

24. The energy storage system of claim 1, wherein the second interface defines one or more modular points of connection with specified electrical and physical characteristics to which the one or more power conversion units conform for coupling to the power transfer network.

25. The energy storage system of claim 1, wherein an energy storage unit or a power conversion unit is electrically connected to a conductor in the power transfer network via a DC/DC converter.

26. A power transfer control system for an energy storage network, comprising:
a power transfer network having a first interface coupleable to one or more energy storage units and a second interface coupleable to one or more power conversion units, wherein the power transfer network includes one or more conductors that are coupleable to the first interface and to the second interface for transferring power to and from one or more energy storage units and one or more power conversion units; and
a processing module configured to receive information indicating a power or energy demand of an external system and information indicating an age of one or more energy storage units coupled to the first interface, and based at least in part on the received information, selectively cause one or more conductors of the power transfer network to electrically connect one or more of the energy storage units via the first interface to one or more of the power conversion units via the second interface and transfer power between the one or more energy storage units and the one or more power conversion units such that older energy storage units are connected to external systems having lower power or energy demands.

27. The power transfer control system of claim 26, wherein the first interface is coupleable to energy storage units that differ with regard to an electrical characteristic.

28. The power transfer control system of claim 27, wherein the electrical characteristic is at least one of energy capacity, power capacity, current capacity, or voltage.

29. The power transfer control system of claim 26, wherein the first interface is coupleable to energy storage units that differ with regard to a physical characteristic.

30. The power transfer control system of claim 26, wherein the second interface is coupleable to power conversion units that differ with regard to an electrical characteristic.

31. The power transfer control system of claim 30, wherein the electrical characteristic is at least one of power capacity, current capacity, or voltage.

32. The power transfer control system of claim 26, wherein the second interface is coupleable to power conversion units that differ with regard to a physical characteristic.

33. The power transfer control system of claim 26, wherein the first interface is coupleable to more energy storage units than power conversion units.

34. The power transfer control system of claim 26, wherein the second interface is coupleable to more power conversion units than energy storage units.

35. The power transfer control system of claim 26, wherein the processing module is configured to communicate with the power transfer network using a standardized, publicly available protocol.

36. The power transfer control system of claim 26, wherein the processing module is configured to communicate with one or more energy storage units.

37. The power transfer control system of claim 26, wherein the processing module is configured to communicate with one or more power conversion units.

38. The power transfer control system of claim 26, wherein the processing module is configured to communicate with a processing module of another power transfer control system according to claim 26.

39. The power transfer control system of claim 26, wherein the processing module is configured to selectively cause a conductor in the power transfer network to electrically connect an energy storage unit to a power conversion unit based on an electrical characteristic of the energy storage unit.

40. The power transfer control system of claim 39, wherein the electrical characteristic of the energy storage unit is at least one of state-of-charge, cycle life, calendar life, voltage, current, power or temperature.

41. The power transfer control system of claim 26, wherein the processing module is configured to selectively cause a conductor in the power transfer network to electrically connect an energy storage unit to a power conversion unit based on an electrical characteristic of the power conversion unit.

42. The power transfer control system of claim 41, wherein the electrical characteristic of the power conversion unit is at least one of voltage, current, or power.

43. The power transfer control system of claim 26, wherein the power transfer network includes one or more switches that are responsive to the processing module to selectively electrically connect a conductor in the power transfer network to an energy storage unit and to a power conversion unit.

44. The power transfer control system of claim 26, wherein the first interface defines one or more modular points of connection with specified electrical and physical characteristics to which the one or more energy storage units conform for coupling to the power transfer network.

45. The power transfer control system of claim 26, wherein the second interface defines one or more modular points of connection with specified electrical and physical characteristics to which the one or more power conversion units conform for coupling to the power transfer network.

46. A computer-readable storage medium having computer-executable instructions stored thereon, wherein in response to execution by a computing device, the instructions cause the computing device to:

receive information indicating a power or energy demand of an external system and information indicating an age of one or more energy storage units that are coupleable to a first interface of a power transfer network, the power transfer network having a second interface coupleable to one or more power conversion units for transferring power to and from the one or more energy storage units and the one or more power conversion units; and based at least in part on the received information, selectively cause one or more conductors of the power transfer network to electrically connect one or more of the energy storage units via the first interface of the power transfer network to one or more power conversion units via the second interface of the power transfer network, and transfer power between the one or more energy storage units and the one or more power conversion units such that older energy storage units are connected to external systems having lower power or energy demands.

47. The computer-readable storage medium of claim 46, wherein the computing device selectively causes a conductor in the power transfer network to electrically connect an energy storage unit to a power conversion unit based on an electrical characteristic of the energy storage unit.

48. The computer-readable storage medium of claim 46, wherein computing device selectively cause a conductor in the power transfer network to electrically connect an energy storage unit to a power conversion unit based on an electrical characteristic of the power conversion unit.

49. The computer-readable storage medium of claim 46, wherein the instructions, in response to execution, cause the computing device to operate one or more switches in the power transfer network to selectively electrically connect the one or more conductors of the power transfer network to the one or more energy storage units and to the one or more power conversion units.

50. The computer-readable storage medium of claim 46, wherein the instructions, in response to execution, cause the computing device to control the power transfer between the one or more energy storage units and the one or more power conversion units using pulse-width modulation.

* * * * *